(12) United States Patent
Mills

(10) Patent No.: US 9,175,608 B1
(45) Date of Patent: Nov. 3, 2015

(54) SPLIT RING FLOATING AIR RIDING SEAL FOR A TURBINE

(71) Applicant: Jacob A Mills, Jupiter, FL (US)

(72) Inventor: Jacob A Mills, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 498 days.

(21) Appl. No.: 13/793,853

(22) Filed: Mar. 11, 2013

(51) Int. Cl.
*F04D 29/08* (2006.01)
*F02C 7/28* (2006.01)

(52) U.S. Cl.
CPC .................................. *F02C 7/28* (2013.01)

(58) Field of Classification Search
CPC ......... F02C 7/28; F01D 11/00; F01D 11/001; F01D 11/003; F01D 11/02; F01D 11/025; F01D 11/04; F01D 11/06

USPC .......................................................... 415/174.3
See application file for complete search history.

(56) References Cited

U.S. PATENT DOCUMENTS 8,066,473 B1 * 11/2011 Aho, Jr. ................. F01D 5/081
415/112

* cited by examiner

*Primary Examiner* — Zelalem Eshete
(74) *Attorney, Agent, or Firm* — John Ryznic

(57) ABSTRACT

A floating air riding seal for a gas turbine engine with a rotor and a stator, an annular piston chamber with an axial moveable annular piston assembly within the annular piston chamber, an annular cavity formed on the annular piston assembly that faces a seal surface on the rotor, and a central passage connecting the annular cavity to the annular piston chamber to supply compressed air to the seal face, where the annular piston assembly is a split piston assembly to maintain a tight seal as coning of the rotor disk occurs.

4 Claims, 2 Drawing Sheets

SPLIT RING FLOATING AIR RIDING SEAL FOR A TURBINE

GOVERNMENT LICENSE RIGHTS

This invention was made with Government support under contract number DE-SC0008218 awarded by Department of Energy. The Government has certain rights in the invention.

CROSS-REFERENCE TO RELATED APPLICATIONS

None.

BACKGROUND OF THE INVENTION

1. Field of the Invention

The present invention relates generally to a gas turbine engine, and more specifically to a seal between a rotor and a stator in the gas turbine engine.

2. Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

One prior art seal used in a gas turbine engine is where the rotor disk includes a labyrinth seal having a number of knife edges that rotates near to a surface on the stationary casing to form a rotary seal. The knife edge seal limits the leakage of flow but does not totally block the leakage. Brush seals are also used to reduce leakage. However, brush seals make contact with the rotating part and therefore cause wear of the brush bristles. Also, brush seals do not make good seals at high rotational speeds. One major problem with this type of rotary seal used in a gas turbine engine is that the gap formed between the rotary seal can vary depending upon the engine temperatures. During engine transients, the knife edges can actually rub against the stationary seal interface and thus cause heating or damaged to the knife edges. Some complex arrangement of parts have been proposed in the prior art to limit the seal gap in these types of rotary seals in gas turbine engines.

U.S. Pat. No. 8,066,473 issued to Aho, J R. on Nov. 29, 2011 and entitled FLOATING AIR SEAL FOR A TURBINE discloses an air riding seal with an annular piston that rides on a surface of a rotor disk in a gas turbine engine, the entire contents being incorporated herein by reference. A cushion of air is formed between the annular piston and the rotor surface. This seal provides for a great seal between the rotor and the stator of the turbine as long as the rotor surface remains true and perpendicular to the rotor axis. When the rotor disk starts to cone (when the disk surface bends away from the annular piston), the seal surface for the annular piston does not seat against the rotor surface.

BRIEF SUMMARY OF THE INVENTION

A Floating air riding seal for a turbine, where the seal includes a two-piece or split annular piston that rides on a surface of a rotor disk and forms the seal. The split annular piston allows for a tight seal surface even when the rotor disk cones or skews or misaligns with the annular piston.

The annular piston moves axially in an annular piston chamber and includes a central passage to supply compressed air to an annular cavity on the end of the annular piston that rides on the rotor surface and forms a cushion of air for the seal.

DETAILED DESCRIPTION OF THE INVENTION

The present invention is an improvement over the floating air seal in the Aho U.S. Pat. No. 8,066,473. The annular piston that forms the floating air seal in the Aho patent is a one piece piston, and thus does not produce an adequate seal when the rotor disk surface cones. In the floating air riding seal of the present invention, the annular piston is a two-piece or split design annular piston that will maintain a good seal even when the rotor disk surface cones.

Figure 1:
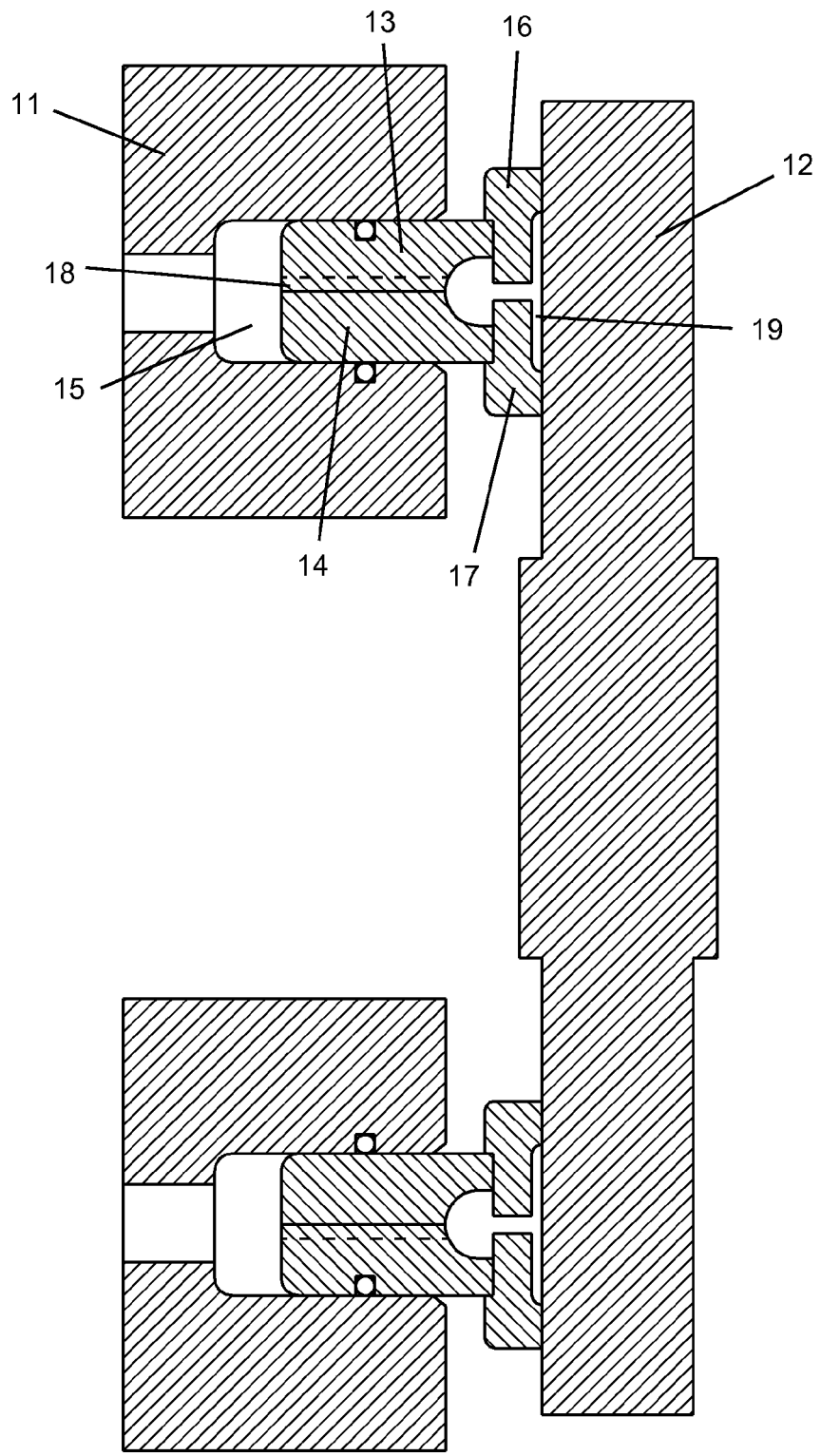
FIG. 1 shows a cross section view of the floating air riding seal of the present invention with a rotor disk not coning.
Figure 2:
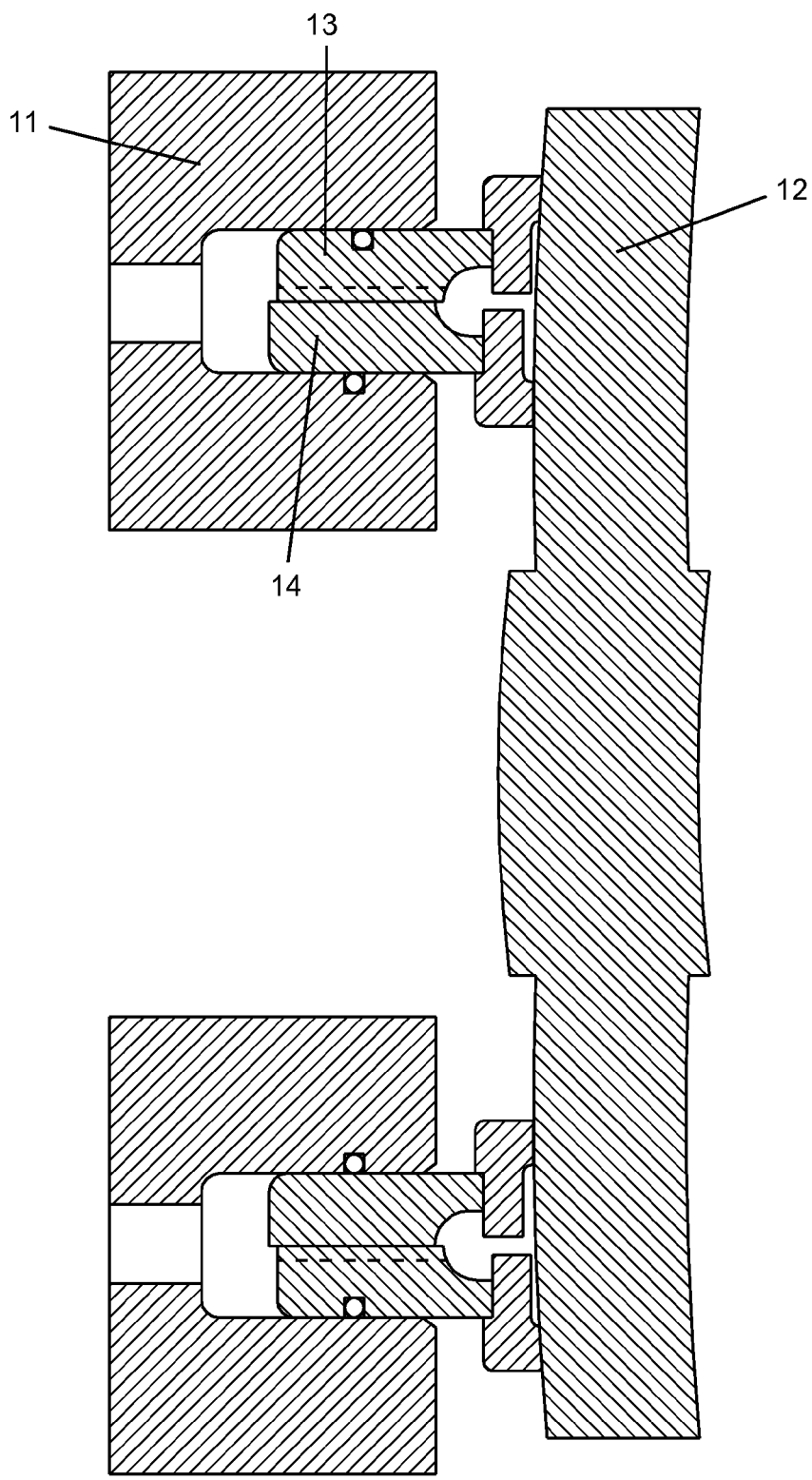
FIG. 2 shows a cross section view of the floating air riding seal of the present invention with a rotor disk coning.

FIG. 1 shows the floating air riding seal of the present invention with a stator 11, a rotor 12, an annular piston assembly with an outer annular piston piece 13 and an inner annular piston piece 14, an annular groove or piston chamber 15 in which the annular piston assembly can move in an axial direction, an outer annular piston head 16 and an inner annular piston head 17 both attached to the annular pistons 13 and 14 and form an annular cavity 19 on a side facing the rotor sealing surface, and a central passage 18 formed in one or both of the annular piston pieces and heads that opens into the annular piston chamber 15 on one end and the annular cavity 19 on the opposite end. The annular piston assembly is two pieces so that when the rotor disk surface bends or cones, the outer annular piston and head can move relative to the inner annular piston and head in order to maintain the seal. The piston head s 16 and 17 are secured to the respective annular piston pieces 13 and 14 to form a single piece. FIG. 2 shows the rotor disk surface coning with the two annular pistons and heads axially shifted to account for the bending. The inner annular piston and head is moved leftward more than the outer annular piston and head due to the coning of the rotor disk surface.

Compressed air is supplied to the annular piston chamber 15 and then through the central passage 18 and into the annular cavity 19 to form a cushion of air so that the annular piston heads 16 and 17 will float over the rotor disk surface and create the seal between the stator 11 and the rotor 12. The annular piston assembly includes a number of central passages 18 spaced in an annular arrangement to supply compressed air to the annular cavity 19.

The two piece or split design air riding seal allows the seal to maintain a tight clearance to the rotor disk surface at both the inner and outer sealing surfaces. Thus making the seal insensitive to rotor disk coning, skew or other misalignments.

I claim the following:

1. A gas turbine engine comprising:
a stator with a stator vane;
a rotor with a rotor blade;
an annular piston chamber formed in the stator;
a floating air sealing surface formed on the rotor;

an annular piston assembly axially moveable within the annular piston chamber;

an annular cavity formed on an end of the annular piston assembly that faces the floating air sealing surface on the rotor;

a central passage formed in the annular piston assembly to connected the annular cavity to the annular piston chamber to supply compressed air to the annular cavity; and, the annular piston assembly being a split piston assembly so that a seal is maintained on the sealing surface of the rotor when coning occurs.

2. The gas turbine engine of claim 1, and further comprising:

the annular piston assembly includes an outer piston piece and outer piston head forming a single piece;

an inner piston piece and an inner piston head forming a single piece; and, the annular cavity formed on the two piston heads.

3. A floating air riding seal comprising:

a stator;

a rotor;

an annular piston chamber formed in the stator;

a floating air sealing surface formed on the rotor;

an annular piston assembly axially moveable within the annular piston chamber;

an annular cavity formed on an end of the annular piston assembly that faces the floating air sealing surface on the rotor;

a central passage formed in the annular piston assembly to connected the annular cavity to the annular piston chamber to supply compressed air to the annular cavity; and, the annular piston assembly being a split piston assembly so that a seal is maintained on the sealing surface of the rotor when coning occurs.

4. The floating air riding seal of claim 3, and further comprising:

the annular piston assembly includes an outer piston piece and outer piston head forming a single piece;

an inner piston piece and an inner piston head forming a single piece; and, the annular cavity formed on the two piston heads.

* * * * *